(12) United States Patent
Holm et al.

(10) Patent No.: US 7,554,734 B1
(45) Date of Patent: Jun. 30, 2009

(54) POLARIZATION INDEPENDENT GRATING

(76) Inventors: Johan Christer Holm, Mosekrogen 33, DK-2860 Søborg (DK); Thomas Sørensen, Leestrupvej 24, Hyllede, DK-4683 Rønnede (DK); Kristian Buchwald, Markvangen 1, DK-2820 Gentofte (DK)

( * ) Notice: Subject to any disclaimer, the term of this patent is extended or adjusted under 35 U.S.C. 154(b) by 236 days.

(21) Appl. No.: 11/503,879

(22) Filed: Aug. 14, 2006

Related U.S. Application Data

(63) Continuation of application No. 11/414,783, filed on Apr. 28, 2006, now abandoned.

(51) Int. Cl.
*G02B 5/18* (2006.01)
(52) U.S. Cl. .................. 359/576; 359/569
(58) Field of Classification Search ............. 359/576, 359/569
See application file for complete search history.

(56) References Cited

U.S. PATENT DOCUMENTS

| | | | |
|---|---|---|---|
| 4,313,648 A | 2/1982 | Yano et al. | |
| 5,982,545 A | 11/1999 | Su | |
| 6,747,799 B2 | 6/2004 | Fabiny et al. | |
| 6,754,006 B2 | 6/2004 | Barton et al. | |
| 6,762,880 B2 | 7/2004 | Holm et al. | |
| 6,900,939 B2 | 5/2005 | Hoshi et al. | |
| 6,978,062 B2 | 12/2005 | Rose et al. | |
| 7,142,363 B2 * | 11/2006 | Sato et al. | 359/569 |
| 7,184,214 B2 * | 2/2007 | Shiozaki et al. | 359/569 |
| 2004/0201892 A1 | 10/2004 | Shiozaki et al. | |
| 2005/0152037 A1 | 7/2005 | Shiozaki et al. | |
| 2005/0200957 A1 * | 9/2005 | Hikichi et al. | 359/569 |
| 2006/0018020 A1 | 1/2006 | Hikichi et al. | |

FOREIGN PATENT DOCUMENTS

JP 2007101926 4/2007

OTHER PUBLICATIONS

Shiozaki, Manabu, et al., "Novel Design of Polarization Independent Multi-layer Diffraction Grating with High Angular Dispersion", *SEI Technical Review*, No. 59, Jan. 2005, pp. 27-31.
Tyan, Rong-Chung, et al., "Polarizing beam splitters constructed of form-birefringent multilayer gratings", Department of Electrical and Computer Engineering, University of California at San Diego, La Jolla, CA, Undated, 10 pages.
U.S. Appl. No. 11/414,783 for Johan Christer Holm, et al. entitled "Polarization Independent Grating," filed Apr. 28, 2006.

* cited by examiner

*Primary Examiner*—Audrey Y Chang
(74) *Attorney, Agent, or Firm*—Altera Law Group, LLC

(57) ABSTRACT

A grating has a high diffraction efficiency into the minus first diffracted order in transmission, for both TE and TM polarizations. The incident angle may optionally be chosen so that the minus first diffracted order in reflection would be retroreflected back to the incident beam. The grating may be formed from various materials and/or layers, where the thicknesses of the individual layers may be determined by an optimization or simulation process. In one aspect, the grating may have four or more layers, formed with three or more materials. In another aspect, the grating may have a longitudinal refractive index profile that contains at least two local extrema, such as a maximum and/or minimum. Such a grating may be formed from three or more materials, two materials, or a single material that has a continuously varying refractive index. Any or all of the materials may have a continuously varying refractive index profile, as well. In another aspect, the grating may include a material that has a continuously varying refractive index profile.

4 Claims, 6 Drawing Sheets

US 7,554,734 B1

POLARIZATION INDEPENDENT GRATING

CROSS-REFERENCE TO RELATED APPLICATIONS

The present application is a continuation of U.S. application Ser. No. 11/414,783 filed Apr. 28, 2006, now abandoned which is incorporated herein by reference thereto in its entirety, as though fully set forth herein.

STATEMENT REGARDING FEDERALLY SPONSORED RESEARCH OR DEVELOPMENT

Not Applicable

BACKGROUND OF THE INVENTION

1. Field of the Invention

The present invention is directed to gratings, and more particularly to polarization-independent transmission gratings.

2. Description of the Related Art

The dispersive effects of a diffraction grating are useful for separating and/or combining optical beams as a function of wavelength. For instance, in the field of telecommunications, where different channels are transmitted over a single optical fiber, the channels are typically spaced apart in wavelength, and a diffraction grating is often used as a dispersive element in a multiplexer and/or demultiplexer that splits out and/or adds in a particular channel.

The polarization state of a beam that passes through a multiplexer and/or demultiplexer may be the source of illumination loss fluctuations caused by polarization fluctuations, commonly referred to as "polarization dependent loss". This polarization dependent loss is commonly expressed in decibels (dB), and represents the difference between the minimum and maximum transmitted powers through the multiplexer and/or demultiplexer, as the incident polarization is varied over all polarization states.

In many cases, a diffraction grating is a significant source of polarization dependent loss in a multiplexer and/or demultiplexer. Typically, the polarization loss can be traced back to a difference in diffraction efficiency between TE and TM polarized light, for a particular diffracted order. For a transmission grating, in which the signal passes through the minus first diffracted order in transmission, it is highly desirable to minimize the difference between the TE diffraction efficiency and the TM diffraction efficiency for the minus first diffracted order in transmission. By reducing the difference between TE and TM polarizations in the grating, the polarization dependent loss in the multiplexer and/or demultiplexer may also be reduced. In addition, it is generally desirable to maximize both the TE and TM diffraction efficiencies, which may also reduce the overall loss of the multiplexer and/or demultiplexer.

BRIEF SUMMARY OF THE INVENTION

An embodiment is an optical apparatus comprising an essentially transparent substrate; and a grating disposed adjacent the substrate and comprising at least four grating layers of at least three essentially transparent and respectively different materials. The grating has a minus first order diffraction efficiency in transmission of greater than 90% for both TE and TM polarizations.

Another embodiment is an optical apparatus, comprising an essentially transparent substrate; and a grating disposed adjacent the substrate, the grating having a longitudinal refractive index profile comprising at least two local extrema. The grating has a minus first order diffraction efficiency in transmission of greater than 90% for both TE and TM polarizations.

Another embodiment is an optical apparatus, comprising an essentially transparent substrate; and a grating disposed adjacent the substrate and having a material composition with a continuously varying longitudinal refractive index profile. The grating has a minus first order diffraction efficiency in transmission of greater than 90% for both TE and TM polarizations.

DETAILED DESCRIPTION OF THE INVENTION

Because diffraction gratings will be discussed in detail below, it is instructive to provide an example of a generic grating and its associated quantities.

Figure 1:
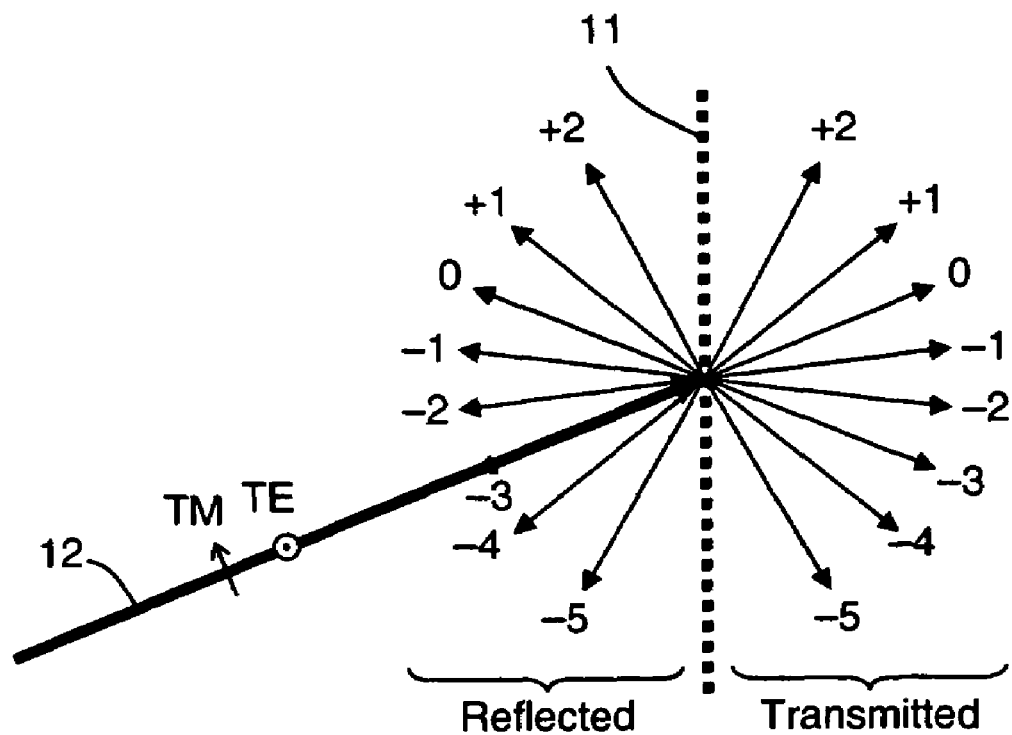
FIG. 1 is a schematic drawing of a generic diffraction grating, an incident beam, TE and TM polarizations, and the orientations of various diffracted beams.

FIG. 1 shows a generic diffraction grating 11. An incident beam 12 strikes the diffraction grating 11 and produces various reflected and transmitted orders. For the numerical examples provided herein, it is assumed that the plane of incidence is perpendicular to the periodic features; this is not a requirement in general and should not be considered a limitation.

The locations of the diffracted orders are given by the well-known grating equation:

$$m\lambda = d(\sin\theta_{out} - \sin\theta_{in}),$$

where m is an integer denoting the mth spectral diffracted order, $\lambda$ is the wavelength of the incident beam, d is the center-to-center spacing of the periodic features of the grating (commonly called the grating pitch or grating period), $\theta_{in}$ is the angle of incidence of the incident beam (formed between the incident ray vector and a surface normal), and $\theta_{out}$ is the angle of exitance of the mth diffracted order. The sign convention for the angles is chosen so that the negative diffracted orders are diverted toward the incident beam, and the positive diffracted orders are diverted away from the incident beam, as shown in FIG. 1.

It is possible, although not necessary, that one of the diffracted orders may be reflected along the same direction as the incident beam 12. For example, In FIG. 1, the minus third order is reflected along the same path as the incident beam 12. A common condition is that the minus first reflected order returns along the same path as the incident beam 12; this condition and it occurs for an incident angle $\theta_{in} = \sin^{-1}(\lambda/2d)$, for suitable values of wavelength $\lambda$ and grating period d. This relationship may be rewritten as $d = \lambda/(2\sin\theta_{in})$, which gives a value of the required grating period d in terms of a wavelength $\lambda$ and a desired incident angle $\theta_{in}$. For incident angles in the range of about 40 degrees to 55 degrees, the required grating period d may be in the range of about 0.6 to about 0.8 times the wavelength $\lambda$, if the grating is to be used where the minus first order in reflection is retroreflected to the incident beam.

FIG. 1 shows the location of all the diffracted orders for particular values of wavelength, grating period and incident angle. However, FIG. 1 does not show the relative power values contained in each order. The power values are typically expressed as the ratio of the power contained in a particular diffracted order, divided by the incident power; this ratio is known as the diffraction efficiency. In general, each diffracted order has its own diffraction efficiency.

For many applications, the grating may be designed to maximize the diffraction efficiency of a particular order, such as the minus first transmitted order. Accordingly, the diffraction efficiency of the minus first transmitted order may be close to 100%, while the diffraction efficiencies of all the other orders may be close to 0%. In general, the diffraction efficiencies of the various orders are determined in part by the grating materials and the shape of the grating features, which may include the grating depth, duty cycle and form.

The polarization state of the incident beam 12 is usually described in terms of two orthogonal components. For one component, the electric field vector is transverse to the plane of incidence; this component is typically denoted as "TE" polarization, and may alternatively be known as "s-polarization". For the other component, the magnetic field vector is transverse to the plane of incidence; this component is typically denoted as "TM" polarization, and may alternatively be known as "p-polarization". In FIG. 1, the plane of incidence is the plane of the page, and the corresponding electric field vectors are shown for TE and TM polarizations. In general, the polarization state may be fully characterized by the ratio of TE to TM polarization components, and the phase between the TE and TM polarization components.

For many gratings, the diffraction efficiency of a particular order may be different for TE and TM polarizations. In general, it is difficult to design a grating that has essentially equal TE and TM diffraction efficiencies for a particular order, and special care must be taken when selecting the materials and the shape for such a grating. In addition, if the TE and TM diffraction efficiencies are to be not only essentially equal, but also close to 100%, the design task becomes even more difficult.

Figure 2:
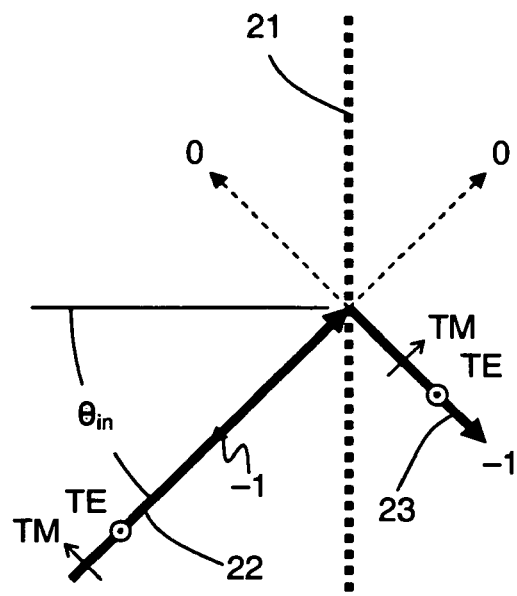
FIG. 2 is a schematic drawing of a grating, an incident beam, TE and TM polarizations, and the orientations of the diffracted beams.

FIG. 2 shows an example of a transmission grating 21 for telecommunications, which can be used as a dispersive element in a multiplexer and/or demultiplexer. An incident beam 22 strikes the grating 21 at incident angle $\theta_{in}$. The minus first reflected order is retroreflected back to the incident beam, although this is not a requirement and should not be construed as a limitation. Two diffracted orders that satisfy the grating equation are the zeroth and minus first orders, which are drawn and labeled in FIG. 2.

For this particular grating 21, it is desirable to have the diffraction efficiency of the minus first transmitted order 23 as large as possible, so that essentially all the power in the incident beam 22 is directed into the minus first transmitted order 23, with a minimal amount of power being directed into the transmitted zeroth order, the reflected zeroth order, and the reflected minus first order. These other three orders are drawn as dotted lines, indicating that they exist, but they preferably contain a minimal amount of optical power in them. In addition, the diffraction efficiency of the minus first transmitted order may be maximized for both TE and TM polarizations, which are also drawn in FIG. 2.

Figure 3:
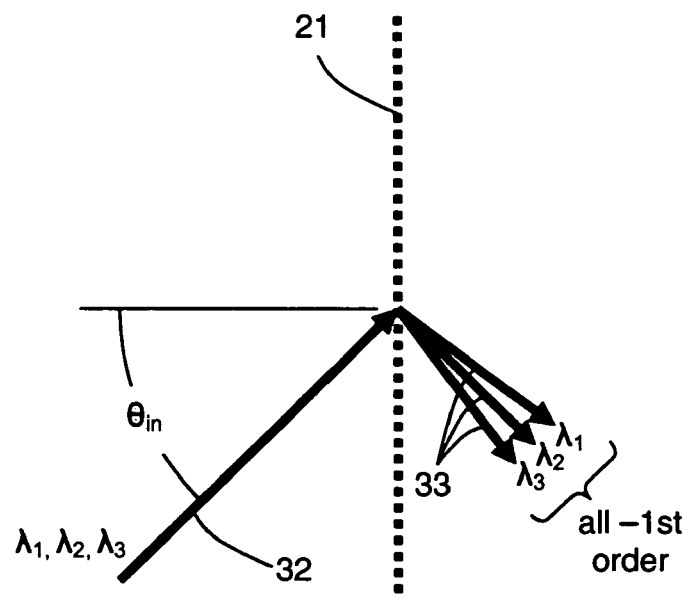
FIG. 3 is a schematic drawing of a grating, an incident beam, and a diffracted beam showing dispersion.

FIG. 3 shows the diffraction grating 21 of FIG. 2 with a multi-wavelength incident beam 32. Although there are three wavelengths shown in FIG. 3, denoted as $\lambda_1$, $\lambda_2$ and $\lambda_3$, there may be any number of wavelengths present in the incident beam 32. The incident beam 32 may have a continuous spectrum, a discrete spectrum, or a combination of both. After transmission through the grating 21, the wavelength components are diffracted at slightly different angles, as shown schematically by the minus first order diffracted beams 33. The diffraction angles are found by applying the grating equation for each wavelength component.

As an example, consider a grating for use in the so-called "C-band" used in the telecommunications field, which has a central wavelength of about 1550 nm. For incident angles of about 45 degrees to 50 degrees, the grating period may be about 1.0 to 1.1 microns so that the minus first order is retroreflected back to the incident beam. As a specific example, for an incident angle of 48.5 degrees and a grating period of about 1.035 microns, the full C-band, spanned by a wavelength range of 1550 nm±25 nm, has an angle of exitance of about 48.5 degrees ± about 2.1 degrees. For this specific example, the wavelength $\lambda_1$, is 1525 nm, the wavelength $\lambda_2$ is 1550 nm and the wavelength $\lambda_3$ is 1575 nm. Note that the longer wavelength $\lambda_3$ diffracts at a larger angle than the shorter wavelength $\lambda_1$, although FIG. 3 is not necessarily drawn to scale.

It is desirable that the diffraction efficiency remain essentially the same for the entire wavelength range over which the grating is to be used, for both TE and TM polarizations. For the numerical example above, this means that the diffraction efficiency of the minus first transmitted order should be roughly constant between 1525 nm and 1575 nm, for both TE and TM polarizations. The wavelength range may be defined in terms of a center wavelength, such as 1550 nm, and a full-width, such as 40 nm, 50 nm (as for the above example), 100 nm and 150 nm. The full-widths may equivalently be expressed as a percentage of the center wavelength, such as 2.6%, 3.2%, 6.5% and 9.7%. Other suitable center wavelengths and full-widths may also be used.

Furthermore, in addition to all the design requirements for the gratings listed above, the grating should have adequate tolerances on its incident angle, so that its diffraction efficiencies do not significantly vary over a range of incident angles. Suitable ranges include 6 degrees (meaning that the incident angle may vary by −3 to +3 degrees), 10 degrees, and 20 degrees, although other suitable ranges may be used. In addition, the grating should have adequate manufacturing tolerances so that reasonable variation in the grating parameters do not unduly affect the diffraction efficiencies.

In other words, the design requirements of the grating 21 may be summarized as follows:

(1) The diffraction efficiency of the minus first transmitted order should be greater than a particular value, for both TE and TM polarizations. This requirement is analogous to an overall loss value or attenuation for a multiplexer and/or demultiplexer. An exemplary value may be about 98%, although other values such as 90%, 92%, 95%, 99% and so forth may be used.

(2) The diffraction efficiencies of TE and TM polarizations should differ from each other by less than a particular value. This is analogous to a polarization dependent loss value for a multiplexer and/or demultiplexer, which arises from fluctuations in the incident polarization state. An exemplary value may be about 0.03 dB, 0.05 dB, 0.10 dB, 0.15 dB and 0.25 dB, although other values may be used.

(3) The diffraction efficiencies should stay within their specifications for reasonable tolerances in usage (such as incident angle and/or wavelength), and reasonable tolerances in manufacturing processes (such as thicknesses, duty cycles and/or wall angles). Collectively, these tolerances or perturbations may be referred to as a "process window", and it is desirable that the grating performance does not vary significantly over the process window.

The gratings 11 and 21 of FIGS. 1-3 are generic in nature, and are drawn only to show the orientations of the reflected and transmitted diffracted orders, the angle of incidence, and the orientations of TE and TM polarizations. For more specific gratings, we refer to FIGS. 4-14.

Figure 4:
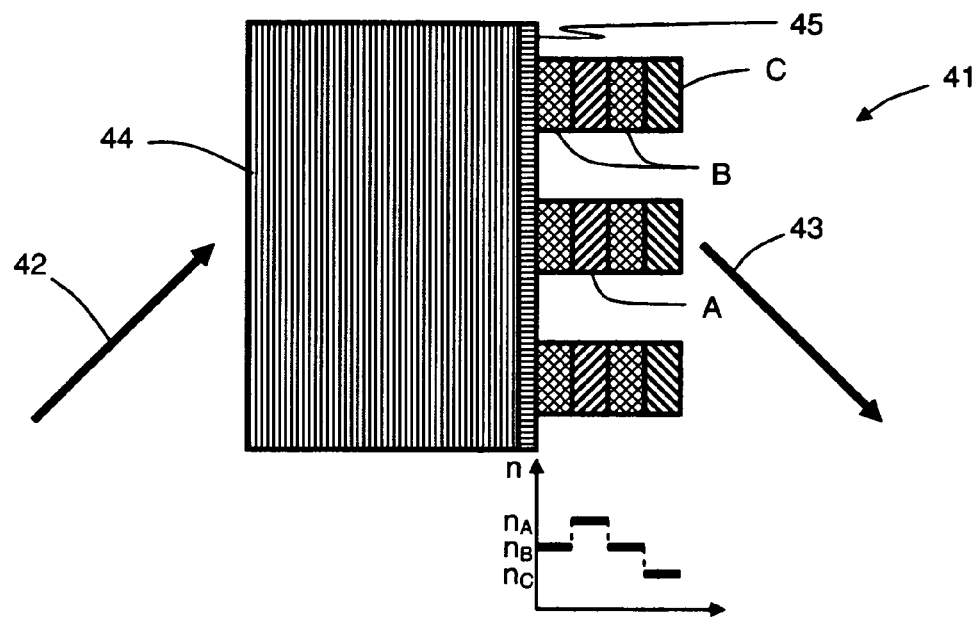
FIG. 4 is a schematic drawing of a grating having four layers and three materials.

FIG. 4 shows a grating 41 having four layers and three different materials, denoted as A, B and C. The grating materials A, B and C have refractive indices $n_A$, $n_B$ and $n_C$, respectively. The grating may be disposed on a layer 45, which may be an etch stop useful during the manufacturing process or may be provided for other purposes, or may be disposed directly on a substrate 44 that supports the grating. Multiple layers such as 45 may be provided between the grating features and the substrate 44, if desired, without disturbing the adjacency of the grating features and the substrate 44. The substrate may be flat or planar on the side having the grating, but the body of the substrate may have any convenient shape.

An incident beam 42 strikes the grating, and the minus first diffracted order in transmission forms the exiting beam 43. It should be noted that the incident and exiting beams are not drawn to scale; both are actually much larger than the grating features themselves. The diffraction efficiencies of the minus first reflected order, the zeroth reflected order and the zeroth transmitted order are sufficiently low to as to be considered negligible; hence, they are not drawn in FIG. 4. The diffraction efficiency of the minus first transmitted order may be maximized for both TE and TM polarizations, and may be up to 98% or larger.

The grating of FIG. 4 has four layers, with three different materials and a distinct material for each layer. The refractive index profile for the grating 41 is shown in a plot at the bottom of FIG. 4. For this particular example, as one moves longitudinally away from the substrate (i.e., along a surface normal) from material B, to material A, to material B, to material C, the refractive index increases, then decreases. There is a local maximum in the longitudinal refractive index profile at the layer for material A. This is merely an exemplary refractive index profile, and other suitable profiles may be used, including profiles that increase or decrease monotonically as one moves longitudinally outward from the substrate.

Note that the functions of the materials A, B and C are all intertwined in the grating 41. One cannot say, for example, that the layer made from material C plays an exclusive role, such as an antireflection coating. Rather, it is the combination of the four layers, all taken together, that determines the characteristics of the grating 41.

Although the longitudinal extents (or, equivalently, heights or depths) of the four layers are drawn as equal in FIG. 4, they may all have different heights. The heights may be varied, and may all vary from less than a micron to several microns each. The heights may be determined by simulation, using any of several commercially available simulation packages.

Exemplary materials for the substrate 44 may include synthetic fused silica, which has a refractive index of 1.444 at a wavelength of 1550 nm, a borosilicate crown glass such as BK7 (n=1.501 at 1550 nm), or a flint glass such as SF2 (n=1.613 at 1550 nm) or SF11 (n=1.745 at 1550 nm), or other optical glasses such as LaSFN9 (n=1.813 at 1550 nm), BaK1 (n=1.555 at 1550 nm) or F2 (n=1.595 at 1550 nm). Other suitable substrate materials may also be used.

Exemplary grating materials may include silicon dioxide, $SiO_2$ (n≈1.44-1.47 at 1550 nm, depending on the vendor and deposition process), titanium dioxide, $TiO_2$ (n≈2.20-2.36 at 1550 nm), or tantalum pentoxide, $Ta_2O_5$ (n≈2.00-2.11 at 1550 nm). Note that "tantalum" may also be known as "tantalium", and "pentoxide" may also be known as "pentaoxide". Note also that these materials are essentially transparent over the wavelength range of interest; there is essentially no absorption over these wavelengths. Other suitable grating materials may be used as well, including a variety of oxides, fluorides, nitrides, carbides and diamond.

As a specific example, material B may be $Ta_2O_5$, material A may be $TiO_2$, and material C may be $SiO_2$.

The etch stop layer may be any suitable material, such as $Al_2O_3$ or $CaF_2$. In general, the etch stop should be relatively resistant to the etching agent. A suitable etching agent may be a fluorine plasma, although other suitable etching agents may be used.

An exemplary manufacturing process for the grating is as follows. First, the optional etch stop 45 may be deposited on the substrate 44. Next, the grating materials A, B and C may be deposited sequentially onto the etch stop (or directly onto the substrate) in a manner analogous to thin film deposition. The grating materials may be deposited in essentially continuous planes, without the grating structure. Next, a photolithographic process may be used, in which the grating structure may be etched into the A, B and C materials. If there is an etch stop present on the substrate, the etching may be continued until the etch stop is reached. Use of an etch stop may be preferred, in that the etch stop sets the etch depth and avoids etching into the substrate 44, rather than the relatively imprecise use of a known etch rate and a timer. This manufacturing process is merely an example, and other suitable manufacturing processes may be used. If the etching characteristics of the etch stop 45 and the substrate 44 are sufficiently different, the grating structure may be etched into the etch stop 45 if desired, without etching into the substrate 44.

A quantity commonly known as the "duty cycle" is the ratio of the grating feature width (i.e., the lateral extent of the grating feature), divided by the grating period (i.e., the center-to-center lateral spacing of the grating features). The duty cycle of a grating may vary from 0% to 100% in principle; duty cycles between 20% and 80% are more typical, with a preferable range of about 40% to about 70%. A common target duty cycle may be about 55%, although other target duty cycles may be used.

Note that the grating feature walls in FIG. 4 are essentially rectangular (i.e., parallel to the surface normal). Such rectangular walls may be considered desirable, and may result from etching directly "downward" with little or no lateral effects. In practice, there may be some lateral etch effects that result in a slight incline to the walls.

Alternatively, there may be some desirable characteristics from a deliberately finite wall slope, although the etch process to make such a slope may be more difficult. A finite wall slope produces trapezoidal walls. Note that the walls may be asymmetric or symmetric.

Note also that although the grating is shown in FIG. 4 as facing away from the incident beam 42, the grating may also be located on the opposite side of the substrate 44, facing toward the incident beam. The arrangement of FIG. 4 may be preferable, in that an antireflection coating on the planar side of the substrate need only be optimized for one incident angle, rather than a range of incident angles for the reverse arrangement. Such an antireflection coating may reduce Fabry-Perot (etalon) effects within the substrate.

Figure 5:
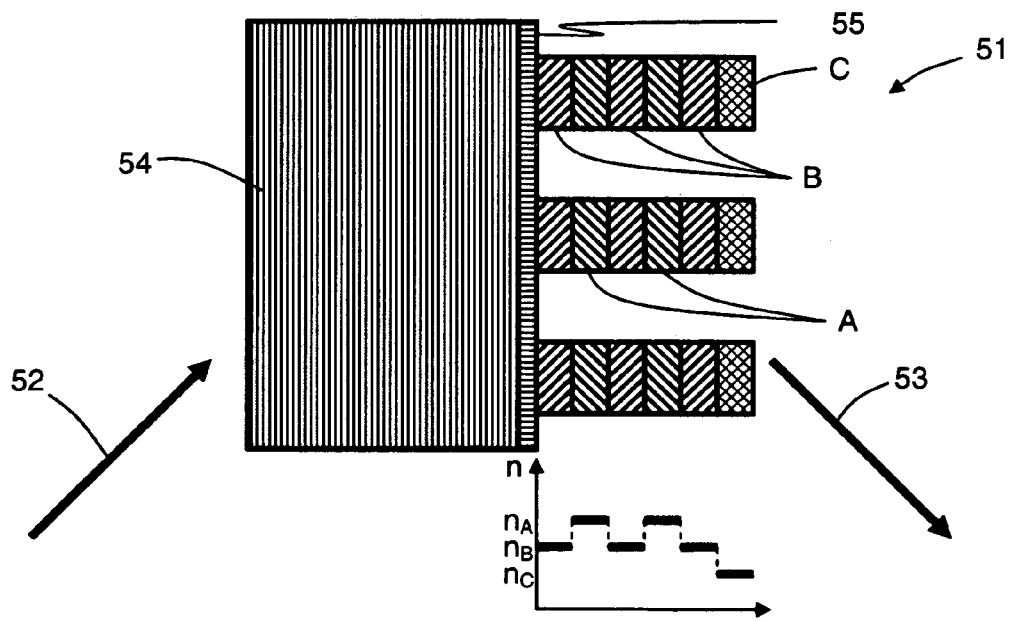
FIG. 5 is a schematic drawing of a grating having six layers and three materials.

FIG. 5 shows a grating 51 that has six layers, using three materials A, B and C. The grating 51 as shown is disposed directly upon an optional etch stop 55, or may be disposed directly upon the substrate 54 if the etch stop 55 is not needed. An incident beam 52 strikes the grating 51. The grating has high diffraction efficiencies into the minus first transmitted diffracted order in both TE and TM polarizations. As a result, most of the power in the incident beam 52 is directed into the minus first transmitted diffracted order, which forms the exiting beam 53.

The grating 51 may have nearly rectangular walls and a duty cycle of roughly 40% to 70%, although other wall angles and duty cycles may be used. In addition, the depths (or, equivalently, "heights" or "thicknesses") of the various layers may be optimized and may take on any value up to several microns or more. The layer depths may be predetermined by an optimization or simulation step, performed prior to manufacturing the grating. The layer depths may be equal or unequal to each other.

As a specific example, material A may be titanium dioxide, material B may be tantalum pentoxide, and material C may be silicon dioxide. This is merely an example, and any suitable materials may be used.

Note also that the edges of each of the layers A, B and C of the grating features are mutually aligned. While this is desirable in practice, there may be some desirable characteristics from a deliberate misalignment, although the process to achieve such a misalignment may be more difficult.

The refractive index profile of the grating 51 is plotted at the bottom of FIG. 5. Note that the profile does not vary monotonically as in FIG. 4, but has at least one local maximum and minimum. In this case, there are two local maxima, located at the layers for material A. Likewise, there is one local minimum, located at the middle layer for material B, located in this case between the layers for material A. These local extrema in the refractive index profile need not be located exactly as drawn in FIG. 5, but can have any suitable location in the grating 51.

Figure 6:
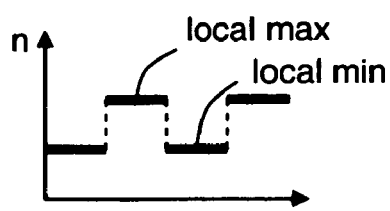
FIG. 6 is a plot of longitudinal refractive index profile of a grating having four layers and two materials.
Figure 7:
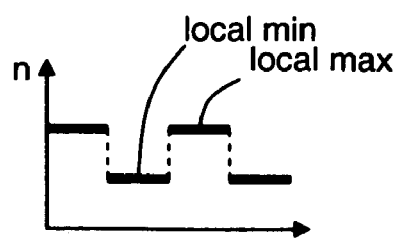
FIG. 7 is a plot of longitudinal refractive index profile of a grating having four layers and two materials.

For instance, the refractive index profiles shown in FIGS. 6 and 7 are analogous to those shown in FIGS. 4 and 5, and correspond to a grating with four layers, formed from two materials. In the four layer gratings represented by FIGS. 6 and 7, the refractive index profile goes through two local extrema. In these refractive index profiles, there is one local maximum and one local minimum, located at the central two layers.

Figure 8:
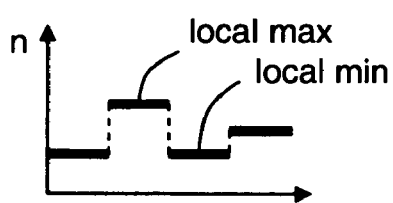
FIG. 8 is a plot of longitudinal refractive index profile of a grating having four layers and three materials.
Figure 9:
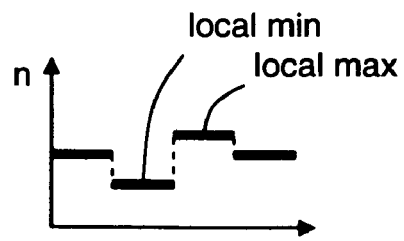
FIG. 9 is a plot of longitudinal refractive index profile of a grating having four layers and three materials.
Figure 10:
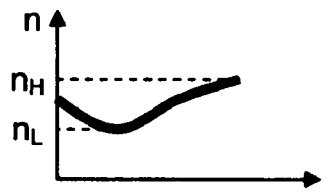
FIG. 10 is a plot of longitudinal refractive index profile of a grating having a material with a continuously varying refractive index.
Figure 11:
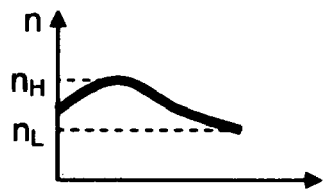
FIG. 11 is a plot of longitudinal refractive index profile of a grating having a material with a continuously varying refractive index.
Figure 12:
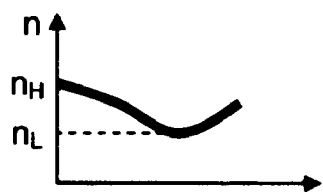
FIG. 12 is a plot of longitudinal refractive index profile of a grating having a material with a continuously varying refractive index.
Figure 13:
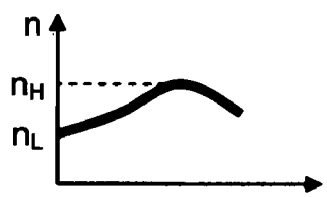
FIG. 13 is a plot of longitudinal refractive index profile of a grating having a material with a continuously varying refractive index.

Two further examples of refractive index profiles with local extrema are shown in FIGS. 8 and 9. The gratings represented by FIGS. 8 and 9 both have four layers and use three different materials. Both also have one local maximum and one local minimum in their refractive index profiles, located at the central two layers.

It will be readily apparent to one of ordinary skill in the art that there may be additional local maxima and minima in the refractive index profile, for additional layers and/or additional materials used in the grating.

It should also be noted that there may be local maxima and/or local minima in the refractive index profile even if a single material is used, if the material has a continuously varying refractive index, such as a gradient index material. FIGS. 10-13 show examples of refractive index profiles that have one local extremum, for a material with a refractive index that varies between $n_L$ and $n_H$. It will be readily understood by one of ordinary skill in the art that such a gradient index material may be used in combination with other materials and other layers to form local extrema in the refractive index profile.

Figure 14:
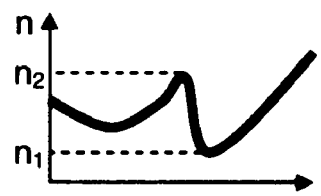
FIG. 14 is a plot of longitudinal refractive index profile of a grating having a material with a continuously varying refractive index.

FIG. 14 shows a refractive index profile having two local extrema, denoted by refractive indices $n_1$ and $n_2$. This profile may correspond to a single layer that has a continuously varying refractive index profile.

It will be beneficial to summarize thus far. A grating is produced having a high diffraction efficiency into the minus first diffracted order in transmission, for both TE and TM polarizations. The incident angle may optionally be chosen so that the minus first diffracted order in reflection would be retroreflected back to the incident beam. The grating may be formed from various materials and/or layers, where the thicknesses of the individual layers may be determined by an optimization or simulation process.

In one aspect, the grating may have four or more layers, formed with three or more materials, as in FIGS. 4 and 5.

In another aspect, the grating may have a longitudinal refractive index profile that contains at least two local extrema, such as a maximum and/or minimum. Such a grating may be formed from three or more materials, as in FIGS. 5, 8 and 9, two materials, as in FIGS. 6 and 7, or a single material that has a continuously varying refractive index, as in FIGS. 10-14. Any or all of the materials may have a continuously varying refractive index profile, as well.

In another aspect, the grating may include a material that has a continuously varying refractive index profile.

Finally, it is beneficial to provide a specific numerical example of a grating of the form shown in FIG. 5. This exemplary grating has six layers and is formed from three materials, labeled as "A", "B" and "C" in FIG. 5.

The design wavelength of the grating is 1550 nm, and plots are shown for a wavelength range of 1550 nm±75 nm. (This corresponds to a full-width of 150 nm, or 9.7% of the center wavelength.)

The grating period (or pitch) is 1064 nm, or about 0.69 times the design wavelength. Equivalently, the period may be expressed as 940 lines per mm. If the grating is to be used so that the minus first order is retroreflected back to the incident beam, the incident angle should be $\sin^{-1}$ (1550 nm/2/1064 nm), or about 47 degrees. A plot is shown for an incident angle range of 37 degrees to 57 degrees, corresponding to a full-width of 20 degrees.

The grating walls are roughly rectangular in profile. The duty cycle is 55%, meaning that the grating features have a width of 55% of the grating period, or about 585 nm.

The grating has six layers, as shown schematically in FIG. 5. For convenience, the layers are numbered 1 through 6, with 1 being adjacent to the substrate, and 6 being adjacent to air.

The substrate is fused silica, which has a refractive index of 1.444 at the design wavelength of 1550 nm.

Layer 1 (corresponding to material B) is tantalum pentoxide, $Ta_2O_5$, which has a refractive index of about 2.0816±0.005 at 1550 nm. The thickness (or, equivalently, height or depth) of layer 1 is 235 nm±5 nm.

Layer 2 (material A) is titanium dioxide, $TiO_2$, which has a refractive index of about 2.2815±0.005 at 1550 nm. The thickness of layer 2 is 190 nm±5 nm.

Layer 3 (material B) is $Ta_2O_5$. The thickness of layer 3 is 170 nm±5 nm.

Layer 4 (material A) is $TiO_2$. The thickness of layer 4 is 190 nm±5 nm.

Layer 5 (material B) is $Ta_2O_5$. The thickness of layer 5 is 370 nm±10 nm.

Layer 6 (material C) is silicon dioxide, $SiO_2$, which has a refractive index of about 1.4490±0.005 at 1550 nm. The thickness of layer 6 is 320 nm±10 nm.

Note that the six layer grating of this numerical example has a longitudinal refractive index profile similar to that shown schematically in FIG. 5, having two local maxima and one local minimum. It is understood that the layer thicknesses are as described numerically above, and are not all equal as shown schematically in FIG. 5.

The grating is oriented away from the incident beam, and it is assumed that the side opposite the grating is perfectly anti-reflection coated.

Figure 15:
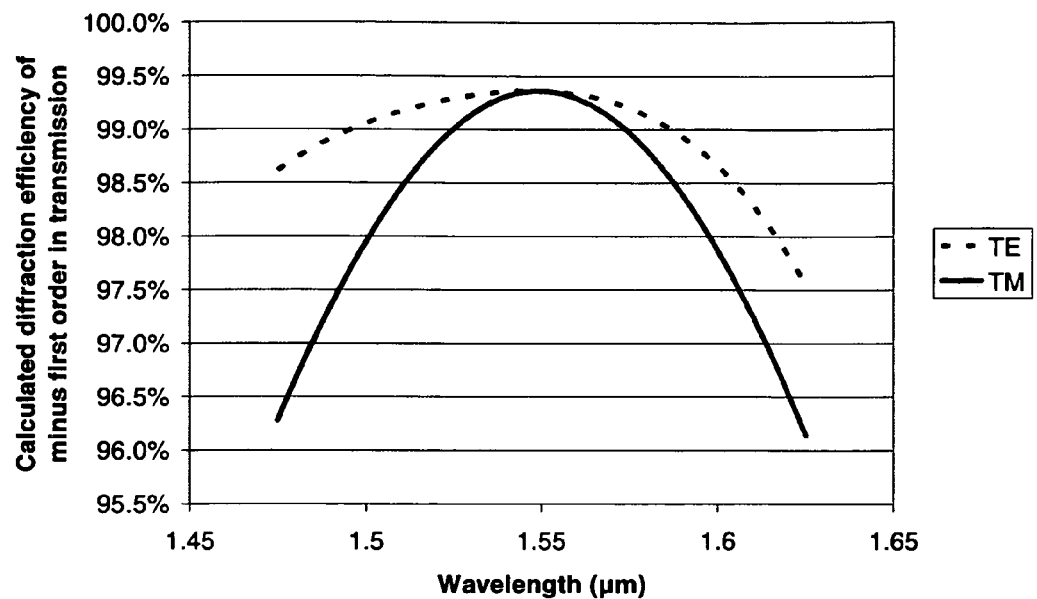
FIG. 15 is a plot of calculated minus first order diffraction efficiencies for TE and TM polarizations, as a function of wavelength, for a constant incident angle of 47 degrees, for an exemplary, six-layer grating.

FIG. 15 shows a plot of the calculated minus first order diffraction efficiencies for TE and TM polarizations, as a function of wavelength, for a constant incident angle of 47 degrees.

At the center wavelength of 1550 nm, the diffraction efficiencies of the minus first order in transmission for TE and TM polarizations are both 99.4%. This corresponds to an insertion loss in dB of $-10 \log_{10}(0.994)$, or less than 0.03 dB.

At the short wavelength edge of the range, at 1475 nm, the TE diffraction efficiency is 98.6% (corresponding to an insertion loss of about 0.06 dB), and the TM diffraction efficiency is 96.3% (or 0.16 dB loss).

At the long wavelength edge of the range, at 1625 nm, the TE diffraction efficiency is 97.5% (or 0.11 dB loss), and the TM diffraction efficiency is 96.1% (or 0.17 dB loss).

In addition to the insertion loss, an important quantity is the polarization dependent loss (PDL) for the grating, found by taking the difference in insertion loss (in dB) between the TE and TM polarizations. The calculated polarization dependent loss is shown in FIG. 16, as a function of wavelength, for a constant incident angle of 47 degrees.

At the center wavelength of 1550 nm, the polarization dependent loss is essentially 0 dB, because the diffraction efficiencies of the minus first order in transmission for TE and TM polarizations are essentially equal.

At the short wavelength edge of the range, at 1475 nm, the polarization dependent loss is about (0.16 dB-0.06 dB), or about 0.10 dB. At the long wavelength edge of the range, at 1625 nm, the polarization dependent loss is about (0.17 dB-0.11 dB), or about 0.06 dB.

Figure 16:
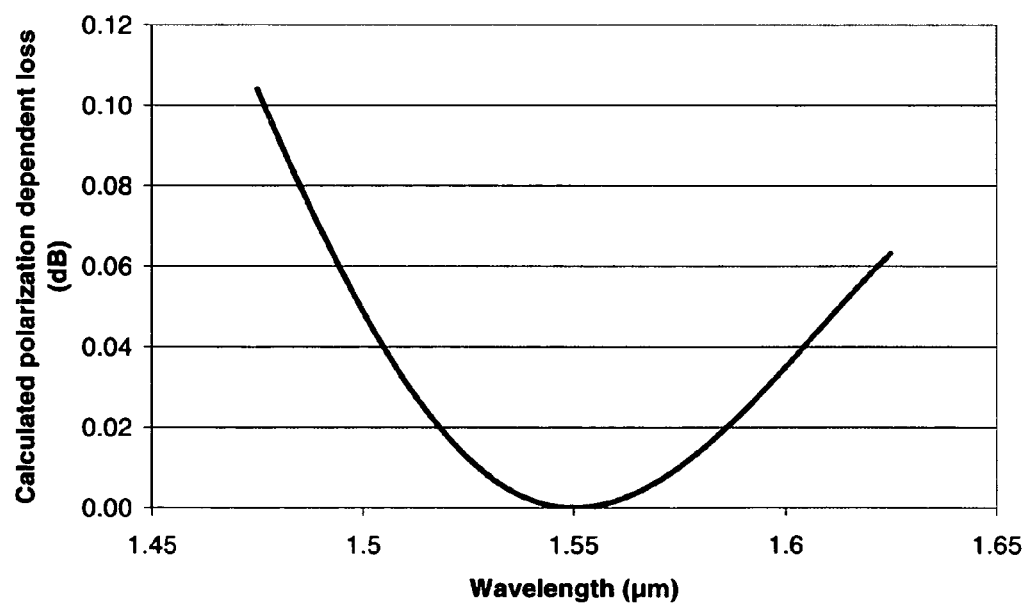
FIG. 16 is a plot of polarization dependent loss, as a function of wavelength, for a constant incident angle of 47 degrees, for the exemplary, six-layer grating of FIG. 15.

Although the PDL data in FIG. 16 may be calculated from the diffraction efficiency data in FIG. 15, it is beneficial to plot the PDL separately because PDL is commonly listed as its own specification in many telecommunications applications. Physically, the PDL represents the difference between the minimum and maximum transmitted powers through the specified device, as the incident polarization is varied over all polarization states. In general, it is highly desirable to minimize PDL, where possible, in addition to minimizing insertion loss.

Figure 17:
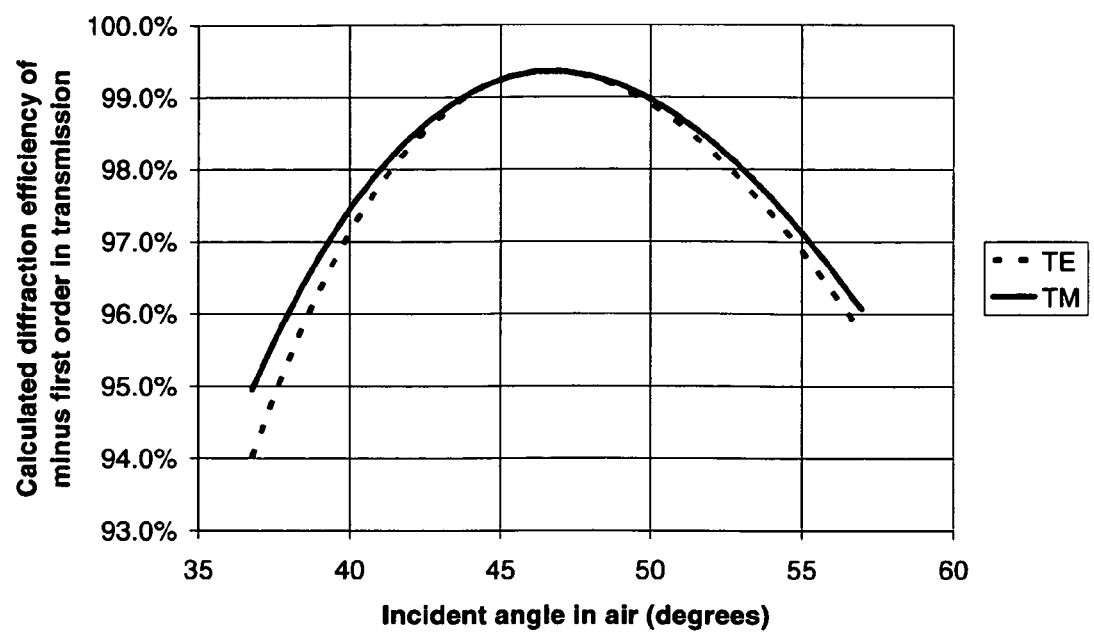
FIG. 17 is a plot of calculated minus first order diffraction efficiencies for TE and TM polarizations, as a function of incident angle, for a constant wavelength of 1550 nm, for the exemplary, six-layer grating of FIG. 15.

To show that the grating is relatively insensitive to incident angle, FIG. 17 a plot of the calculated minus first order diffraction efficiencies for TE and TM polarizations, as a function of incident angle, for a constant wavelength of 1550 nm.

At the center of the incident angle range (47 degrees), the diffraction efficiencies of the minus first order in transmission for TE and TM polarizations are both 99.4%.

The diffraction efficiencies for both TE and TM polarizations are both greater than 99% over an incident angle range of about 44 degrees to about 50 degrees.

The diffraction efficiencies for both TE and TM polarizations are both greater than 98% over an incident angle range of about 42 degrees to about 52 degrees.

At an incident angle of 37 degrees, the TE diffraction efficiency is 94.0%, and the TM diffraction efficiency is 94.9%.

At an incident angle of 57 degrees, the TE diffraction efficiency is 95.8%, and the TM diffraction efficiency is 96.1%.

In general, if the diffraction efficiencies vary slowly with respect to incident angle, there may be a relaxed tolerance on the grating orientation during the alignment and assembly process, leading to an increased ease in manufacture of a device that uses the grating.

In addition, there may be configurations that explicitly use multiple incident angles within a particular range, such as a two-grating configuration in which light dispersed from a first grating strikes a second grating. An example of a two-grating configuration is disclosed in U.S. Pat. No. 6,978,062, titled "Wavelength division multiplexed device", issued on Dec. 20, 2005 to Rose, et al., which is incorporated by reference herein in its entirety.

Although the numerical examples provided herein are primarily for a multiplexer and/or demultiplexer for the telecommunications C-band (sometimes known as "conventional"), centered at a wavelength of 1550 nm, other applications and wavelength regions may be used. For example, the S-band (or "short"), the L-band (or "long") and the band centered around 1300 nm may all be used. In addition, the gratings described herein may be used for laser pulse compression, and may operate at wavelength ranges centered around 800 nm or 1064 nm. Other applications and spectral regions may used as well.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. An optical apparatus, comprising:
   an essentially transparent substrate; and
   a grating disposed adjacent the substrate and comprising exactly four grating layers of at least three essentially transparent and respectively different materials;

wherein the grating has a minus first order diffraction efficiency in transmission of greater than 90% for both TE and TM polarizations; and wherein:
  a first one of the grating layers is tantalum pentoxide and is disposed adjacent the substrate;
  a second one of the grating layers is titanium dioxide and is disposed directly upon the first grating layer;
  a third one of the grating layers is tantalum pentoxide and is disposed directly upon the second grating layer; and
a fourth one of the grating layers is silicon dioxide and is disposed directly upon the third grating layer.

2. The optical apparatus of claim 1, further comprising an etch stop layer disposed between the first grating layer and the substrate, the etch stop layer being disposed directly upon the substrate, and the first grating layer being disposed directly upon the etch stop layer.

3. An optical apparatus, comprising:
  an essentially transparent substrate; and
  a grating disposed adjacent the substrate and comprising exactly six grating layers of at least three essentially transparent and respectively different materials;
  wherein the grating has a minus first order diffraction efficiency in transmission of greater than 90% for both TE and TM polarizations; and wherein:
    a first one of the grating layers is tantalum pentoxide and is disposed adjacent the substrate;
    a second one of the grating layers is titanium dioxide and is disposed directly upon the first grating layer;
    a third one of the grating layers is tantalum pentoxide and is disposed directly upon the second grating layer;
    a fourth one of the grating layers is titanium dioxide and is disposed directly upon the third grating layer;
    a fifth one of the grating layers is tantalum pentoxide and is disposed directly upon the fourth grating layer; and
    a sixth one of the grating layers is silicon dioxide and is disposed directly upon the fifth grating layer.

4. The optical apparatus of claim 3, further comprising an etch stop layer disposed between the first grating layer and the substrate, the etch stop layer being disposed directly upon the substrate, and the first grating layer being disposed directly upon the etch stop layer.

\* \* \* \* \*